(12) United States Patent
Yoshihara et al.

(10) Patent No.: US 12,337,698 B2
(45) Date of Patent: Jun. 24, 2025

(54) VEHICLE AND VEHICLE CONTROL SYSTEM

(71) Applicant: YAMAHA HATSUDOKI KABUSHIKI KAISHA, Iwata (JP)

(72) Inventors: Masanori Yoshihara, Shizuoka (JP); Masaki Sawada, Shizuoka (JP)

(73) Assignee: YAMAHA HATSUDOKI KABUSHIKI KAISHA, Shizouka (JP)

( * ) Notice: Subject to any disclaimer, the term of this patent is extended or adjusted under 35 U.S.C. 154(b) by 170 days.

(21) Appl. No.: 18/375,703

(22) Filed: Oct. 2, 2023

(65) Prior Publication Data

US 2024/0025268 A1 Jan. 25, 2024

Related U.S. Application Data

(63) Continuation of application No. PCT/JP2021/014386, filed on Apr. 2, 2021.

(51) Int. Cl.
*B60L 15/20* (2006.01)
*A61G 5/04* (2013.01)

(52) U.S. Cl.
CPC ............... *B60L 15/20* (2013.01); *A61G 5/04* (2013.01); *B60L 2200/34* (2013.01); *B60L 2240/12* (2013.01); *B60L 2240/642* (2013.01)

(58) Field of Classification Search
CPC .. B60L 15/20; B60L 2200/34; B60L 2240/12; B60L 2240/643; A61G 5/04
See application file for complete search history.

(56) References Cited

U.S. PATENT DOCUMENTS

| 4,803,630 | A | * | 2/1989 | Takizawa | B60G 17/0408 180/41 |
| 9,073,399 | B1 | * | 7/2015 | Richter | B60G 17/0165 |
| 9,682,603 | B2 | * | 6/2017 | Richter | A61G 5/1056 |
| 2005/0087375 | A1 | | 4/2005 | Steele et al. | |

FOREIGN PATENT DOCUMENTS

| JP | 61-94504 A | 5/1986 |
| JP | 03-74111 A | 3/1991 |
| JP | 2000-102115 A | 4/2000 |
| JP | 2001-170114 A | 6/2001 |
| JP | 2005-323431 A | 11/2005 |
| JP | 2007-062669 A | 3/2007 |
| JP | 2009-102002 A | 5/2009 |
| JP | 2018-033373 A | 3/2018 |
| JP | 2020-197881 A | 12/2020 |

OTHER PUBLICATIONS

Official Communication issued in corresponding European Patent Application No. 21935049.3, mailed on Mar. 21, 2024.
Official Communication issued in International Patent Application No. PCT/JP2021/014386, mailed on Jun. 22, 2021.

* cited by examiner

*Primary Examiner* — Gertrude Arthur Jeanglaude
(74) *Attorney, Agent, or Firm* — Keating & Bennett, LLP

(57) ABSTRACT

A vehicle includes a vehicle-body frame, a seat, wheels, a power source to generate a force to drive one of the wheels, a controller, and an inclination sensor to detect an inclination, in at least one of pitch or roll of the vehicle-body frame. The controller is configured or programmed to control a vehicle speed in at least one of a direction of advancing or reversing of the vehicle generated by driving the one wheel by the force from the power source depending on the inclination of the vehicle-body frame detected by the inclination sensor.

12 Claims, 9 Drawing Sheets

VEHICLE AND VEHICLE CONTROL SYSTEM

CROSS REFERENCE TO RELATED APPLICATIONS

This application is a Continuation Application of PCT Application No. PCT/JP2021/014386 filed on Apr. 2, 2021. The entire contents of this application are hereby incorporated herein by reference.

BACKGROUND OF THE INVENTION

1. Field of the Invention

The present invention relates a vehicle and a vehicle control system including an inclination sensor.

2. Description of the Related Art

Vehicle attitude control is important in a small-sized vehicle with a small total length relative to the height of the center of gravity, such as an electric wheelchair. For example, JP 2001-170114 A discloses an apparatus for preventing rearward overturn of a wheelchair. This apparatus includes a bracket member fixed to power units for the rear wheels of the wheelchair, a swing arm swingably supported by the bracket, and an overturn prevention wheel at the rear end of the swing arm. The swing arm is biased by a return spring such that the overturn prevention wheel always protrudes rearward of the tracks of rotation of the rear wheels.

JP 2007-062669 A discloses an apparatus for preventing overturn in which one end of an arm is swingably and pivotably supported on a bracket fixed to the vehicle body. An auxiliary wheel for overturn prevention is pivotably supported on the other end of the arm. A biasing means biases the arm downward of the bracket and holds the arm in that state.

JP 2020-197881 A discloses a sensor system capable of reducing errors in determining conditions of the road surface. The sensor system includes a first sensor and a second sensor that detect the presence/absence of a road surface near a movable body, and a determination unit that determines conditions of the road surface. The detection area of the first sensor is located more distant from the movable body than the detection area of the second sensor is. The sensor system limits the speed of the movable body based on the determination by the determination unit.

The above-described conventional techniques propose arrangements for preventing overturn as well as how to control the speed depending on conditions of the road surface. However, no means is available for maintaining the attitude of the vehicle in a comfortable state that allows easy control.

SUMMARY OF THE INVENTION

Preferred embodiments of the present application provide vehicles and vehicle control systems that each make it easier to achieve a comfortable state depending on a traveling environment.

A vehicle according to a preferred embodiment of the present invention includes a vehicle-body frame, a seat attached to the vehicle-body frame to allow an occupant to sit thereon, at least three wheels including front and rear wheels rotatably attached to the vehicle-body frame, a power source to generate a force to drive at least one of the wheels, a controller configured or programmed to control driving of the at least one wheel by the power source based on an operation or a remote operation by the occupant, or autonomously, and an inclination sensor to detect an inclination in at least one of pitch or roll of the vehicle-body frame. The controller is configured or programmed to control a vehicle speed in at least one of a direction of advancing or a direction of reversing the vehicle generated by the driving of the at least one wheel by the force from the power source depending on the inclination of the vehicle-body frame detected by the inclination sensor.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
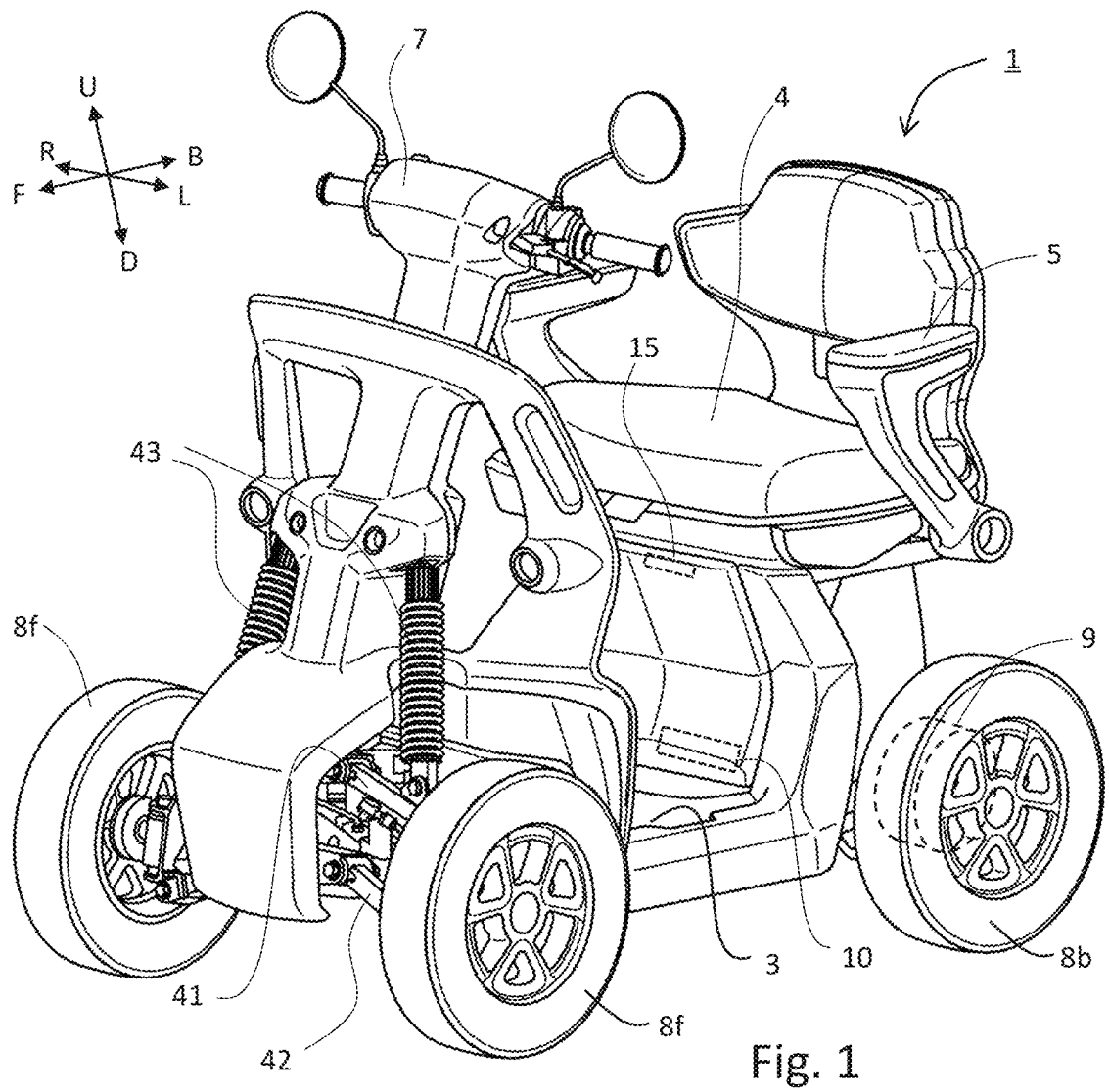
FIG. 1 is a perspective view of a vehicle according to a preferred embodiment of the present invention, showing an exemplary construction.

A vehicle according to a preferred embodiment of the present invention includes a vehicle-body frame, a seat attached to the vehicle-body frame to allow an occupant to sit thereon, at least three wheels including front and rear wheels rotatably attached to the vehicle-body frame, a power source to generate a force to drive at least one of the wheels, a controller configured or programmed to control driving of the at least one wheel by the power source based on an operation or a remote operation by the occupant, or autonomously, and an inclination sensor to detect an inclination in at least one of pitch or roll of the vehicle-body frame. The controller is configured or programmed to control a vehicle speed in at least one of a direction of advancing or a direction of reversing the vehicle generated by the driving of the at least one wheel by the force from the power source depending on the inclination of the vehicle-body frame detected by the inclination sensor.

In the above-described arrangement, the occupant sits on a seat attached to a vehicle-body frame supported by at least three wheels. When a vehicle with this arrangement is traveling at high vehicle speed and is suddenly braked, the at least three wheels of the vehicle may have a non-uniform load. Particularly, when the vehicle is traveling on a slope or in a curve, an axis of the vehicle-body frame in a top-bottom direction is inclined relative to the vertical direction. That is, an inclination in at least one of pitch or roll of the vehicle-body frame is generated. When the vehicle-body frame is thus inclined, the degree of non-uniformity of the load on the at least three wheels upon sudden braking is even higher. As the degree of non-uniformity of the load on the at least three wheels increases, the occupant has more difficulty controlling the attitude, and may feel discomfort. In view of this, in the above-described arrangement, the vehicle speed in at least one of the advancing direction or the reversing direction of the vehicle is controlled depending on the inclination in at least one of pitch or roll of the vehicle-body frame. Thus, for example, even when the vehicle with its vehicle-body frame inclined is suddenly braked, the degree of non-uniformity of the load on the at least three wheels remains in a predetermined range. That is, it is easier to achieve a comfortable state depending on the traveling environment.

As used herein, vehicle speed means the speed of the vehicle relative to the road surface. Direction of advancing and direction of reversing the vehicle each mean the direction in which the vehicle travels, i.e., the direction in which the vehicle moves relative to the ground. When the axis of the vehicle-body frame in the front-rear direction is parallel or substantially parallel to the ground surface, the forward direction with respect to the vehicle-body frame represents the advancing direction, and the rearward direction with respect to the vehicle-body frame represents the reversing direction.

The inclination in pitch detected by the inclination sensor may be a pitch angle, or may be a pitch angular velocity. The inclination in roll detected by the inclination sensor may be a roll angle, or may be a roll angular velocity. The controller may use at least one of the angle or angular velocity detected by the inclination sensor as a value indicating the inclination of the vehicle-body frame. That is, the controller may control the vehicle speed using only one of the angle or angular velocity of the inclination of the vehicle-body frame, or may control the vehicle speed using both the angle and the angular speed.

For example, the controller may control an upper limit of the vehicle speed depending on the inclination of the vehicle-body frame detected by the inclination sensor. For example, when the vehicle-body frame is inclined in a pitch or roll direction, the controller may limit the vehicle speed depending on the inclination. That is, when the vehicle-body frame is inclined, the controller may control the vehicle speed to prevent it from exceeding the upper limit. In such implementations, the controller is able to control the upper limit of the vehicle speed depending on the inclination of the vehicle-body frame detected by the inclination sensor. Thus, when the vehicle is inclined because it is traveling on a slope, for example, it is easier to cause the degree of uniformity of the load on the at least three wheels to remain within a predetermined range.

The controller may control the vehicle speed such that the larger the inclination of the vehicle-body frame, the lower an upper limit of the vehicle speed becomes. The larger the inclination of the vehicle, the more easily the load on the at least three wheels can be non-uniform. In view of this, the vehicle speed is controlled such that the larger the inclination of the vehicle-body frame, the lower the upper limit of the vehicle speed becomes, thus making it easier to cause the degree of uniformity of the load on the wheels to remain within a predetermined range.

By way of example, the controller may cause the upper limit of the vehicle speed, used when the angle of inclination of the vehicle-body frame (i.e., pitch angle or roll angle) is not smaller than a predetermined threshold, to be lower than the upper limit of the vehicle speed used when the angle of inclination is smaller than the threshold. Further, in addition to or in lieu of this control, the controller may perform such a control as to lower the upper limit of the vehicle speed of the vehicle as the inclination of the vehicle increases within a predetermined inclination range.

The controller may perform such a control that, corresponding to the same inclination of the vehicle-body frame detected by the inclination sensor, the upper limit of the vehicle speed in the reversing direction of the vehicle is lower than the upper limit of the vehicle speed in the advancing direction of the vehicle. This enables setting an upper limit of the vehicle speed that is suitable for each of advancing and reversing the vehicle-body frame in an inclined state.

Alternatively, the controller may perform such a control that the larger the inclination of the vehicle-body frame, the lower the vehicle speed becomes. By way of example, the vehicle speed may be reduced when the angle of inclination (pitch angle or roll angle) of the vehicle-body frame exceeds a predetermined threshold. In such implementations, the amount of decrease in the vehicle speed may be controlled depending on the detected angle of inclination. Alternatively, the vehicle speed may be reduced when the angle of inclination in pitch or roll increases. In such implementations, the amount of decrease in the vehicle speed may be controlled depending on the detected angular velocity.

The controller may lower an upper limit of the vehicle speed in the reversing direction of the vehicle when the inclination in pitch detected by the inclination sensor is in a direction with a front portion of the vehicle located higher than a rear portion, and is not smaller than a first threshold. Thus, the controller may lower the upper limit of the vehicle speed when the vehicle is reversing and descending on a slope.

For example, the controller may set the upper limit of the vehicle speed in the reversing direction of the vehicle, used when an inclination in pitch that leads to the front portion of the vehicle being located higher than the rear portion is detected, to a value lower than the upper limit of the vehicle speed in the reversing direction of the vehicle used when an inclination in pitch that leads to the front portion of the vehicle being located lower than the rear portion by the same angle is detected. In other words, the controller may set the upper limit of the vehicle speed used when the vehicle is reversing and descending on a slope to a value lower than the upper limit of the vehicle speed used when the vehicle is advancing and descending on a slope of the same inclination. Thus, the upper limit of the vehicle speed can be set to a value suitable for each of descending on a slope in the advancing direction and descending in the reversing direction.

The controller may lower an upper limit of the vehicle speed in the reversing direction of the vehicle as the inclination in pitch increases within a predetermined pitch range if the inclination in pitch is in a direction with a front portion of the vehicle located higher than a rear portion. Thus, the controller can perform such a control that, when the vehicle is reversing and descending on a slope, then, the larger the inclination, the lower the upper limit of the vehicle speed becomes.

In implementations where the controller lowers the upper limit of the vehicle speed as the inclination in pitch increases, the rate of decrease in the upper limit of the vehicle speed in response to an increase in the inclination in pitch may be constant, or may vary depending on the vehicle speed. The controller may lower the upper limit of the vehicle speed stepwise depending on the increase in the inclination in pitch.

The controller may lower an upper limit of the vehicle speed in the advancing direction or the reversing direction of the vehicle if the inclination in roll detected by the inclination sensor is not smaller than a second threshold. This enables lowering the upper limit of the vehicle speed when the vehicle is traveling in a curve or traversing on a slope. This prevents the degree of non-uniformity of the load on the at least three wheels from increasing.

The controller may lower an upper limit of the vehicle speed in the advancing direction or the reversing direction of the vehicle as the inclination in roll increases within a predetermined roll range. This enables lowering the upper limit of the vehicle speed when the vehicle is turning or traversing on a slope, depending on the inclination. This prevents the degree of non-uniformity of the load on the three wheels from increasing.

In implementations where the controller reduces the upper limit of the vehicle speed as the inclination in roll increases, the rate of decrease in the upper limit of the vehicle speed in response to an increase in the inclination in roll may be constant, or may vary depending on the vehicle speed. The controller may lower the upper limit of the vehicle speed stepwise depending on the increase in the inclination in roll.

The vehicle may further include a handlebar to steer the front wheel or wheels, and a steering detection unit to detect steering by the handlebar. The controller may control the vehicle speed using at least one of a direction of steering or a steering angle detected by the steering detection unit. This enables controlling the vehicle speed more appropriately for the traveling environment depending on both the inclination of the vehicle-body frame and the steering condition. The steering detection unit may include, for example, a rotation sensor to detect rotation of the handlebar or a transmission member in the steering system that rotates together with the handlebar.

For example, the controller may control the vehicle speed depending on the inclination in roll detected by the inclination sensor and at least one of the direction of steering or the steering angle. This enables controlling the vehicle speed depending on the inclination in roll and steering conditions during a turn of the vehicle.

For example, the controller may control the upper limit of the vehicle speed depending on the inclination of the vehicle-body frame detected by the inclination sensor and at least one of the direction of steering or the steering angle detected by the steering detection unit. This enables controlling the upper limit of the vehicle speed more appropriately depending on both the inclination of the vehicle-body frame and steering conditions.

For example, the controller may perform such a control as to lower the upper limit of the vehicle speed in the advancing direction or the reversing direction of the vehicle if the inclination in roll detected by the inclination sensor is not smaller than a roll threshold and steering occurs in the direction opposite to that of the inclination in roll. Thus, the lower limit of the vehicle speed may be lowered when, for example, the vehicle is traversing on a slope and the handlebar is operated to a significant degree to steer in the ascending direction.

The controller may stop the driving of the at least one wheel by the power source when the vehicle speed of the vehicle has reached an automatic-stop speed. The automatic-stop speed may be set to a value higher than an upper limit of the vehicle speed controlled depending on the inclination, and set depending on the inclination of the vehicle-body frame detected by the inclination sensor. This enables setting an appropriate automatic-stop speed depending on the inclination.

The controller may control an upper limit of the vehicle speed depending on the inclination of the vehicle-body frame detected by the inclination sensor. The upper limit of the vehicle speed may be controlled such that the larger the inclination of the vehicle-body frame, the lower the upper limit of the vehicle speed becomes, and the upper limit of the vehicle speed may be set to a minimum value, other than zero, when the inclination is larger than a third threshold. This enables continuing traveling at low vehicle speed even when the inclination of the vehicle-body frame has increased.

The controller may include a false-detection determination unit configured or programmed to determine whether a detection value from the inclination sensor is a false detection and, if the false-detection determination unit has determined that the detection value is a false detection, may fix an upper limit of the vehicle speed of the vehicle to a constant speed regardless of the detection value from the inclination sensor. Thus, in the case of a false detection by the inclination sensor, the upper limit of the vehicle speed is prevented from being set based on the false detection value.

The constant speed may be lower than the upper limit of the vehicle speed used when the vehicle-body frame is not inclined. Thus, for example, when an inclination cannot be detected correctly by the inclination sensor, an upper limit of the vehicle speed can be set taking into account the inclination. The constant speed may be, for example, the minimum upper limit of the vehicle speed, which is the lowest within the range of upper limits of the vehicle speed set when the vehicle is inclined.

A vehicle control system according to a preferred embodiment of the present invention includes a controller to control a vehicle including a vehicle-body frame, a seat attached to the vehicle-body frame to allow an occupant to sit thereon, at least three wheels including front and rear wheels rotatably attached to the vehicle-body frame, and a power source to generate a force to drive at least one of the three wheels. The controller is configured or programmed to control driving of the at least one wheel by the power source based on an operation or a remote operation by the occupant, or autonomously, acquire from an inclination sensor provided on the vehicle information indicating an inclination in at least one of pitch or roll of the vehicle-body frame, and control a vehicle speed in at least one of a direction of advancing or a direction of reversing the vehicle generated by the driving of the at least one wheel by the force from the power source depending on the inclination of the vehicle-body frame acquired from the inclination sensor.

Now, preferred embodiments of the present invention will be described in detail with reference to the drawings.

Figure 2:
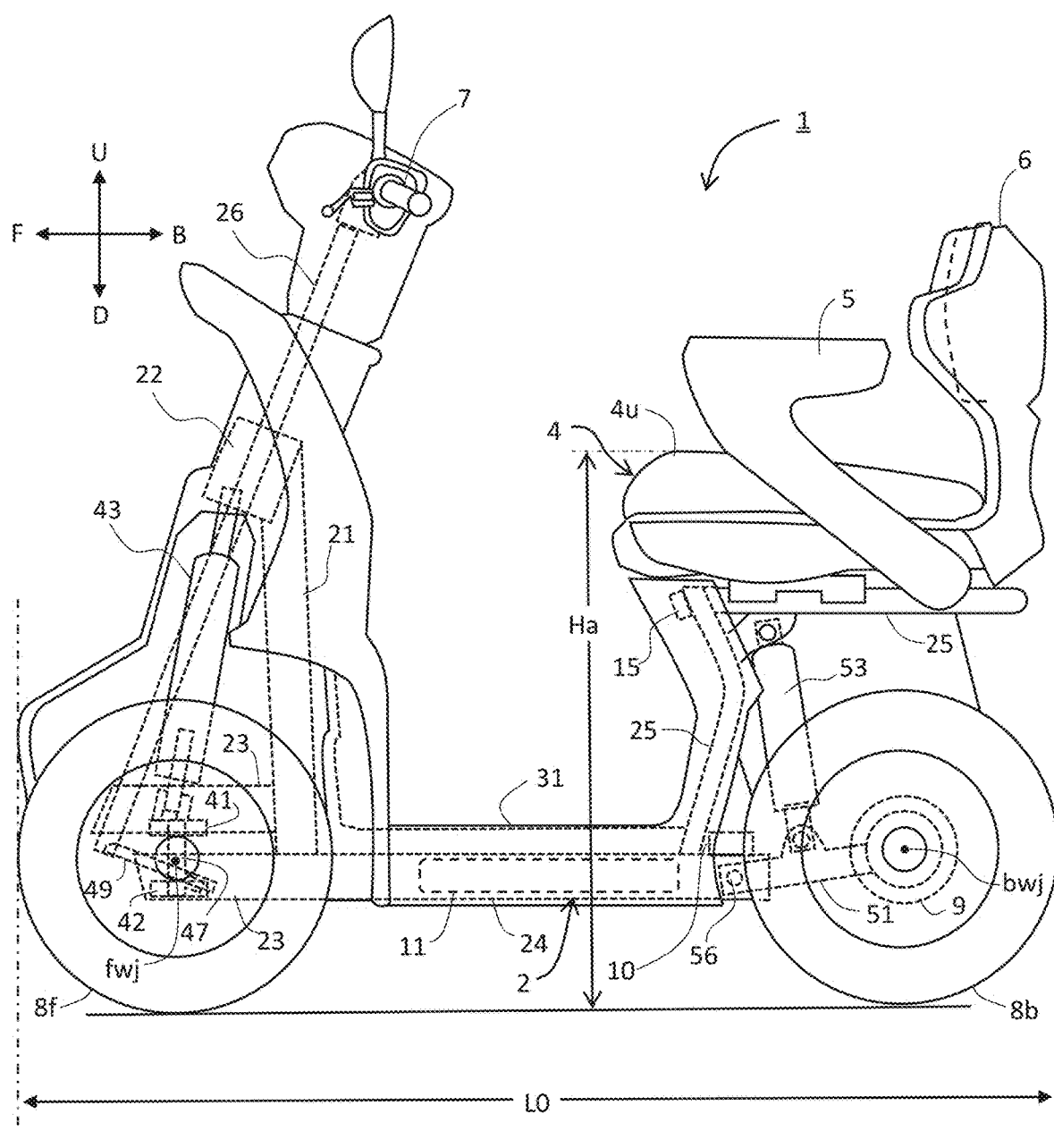
FIG. 2 is a side view of the vehicle shown in FIG. 1.
Figure 9:
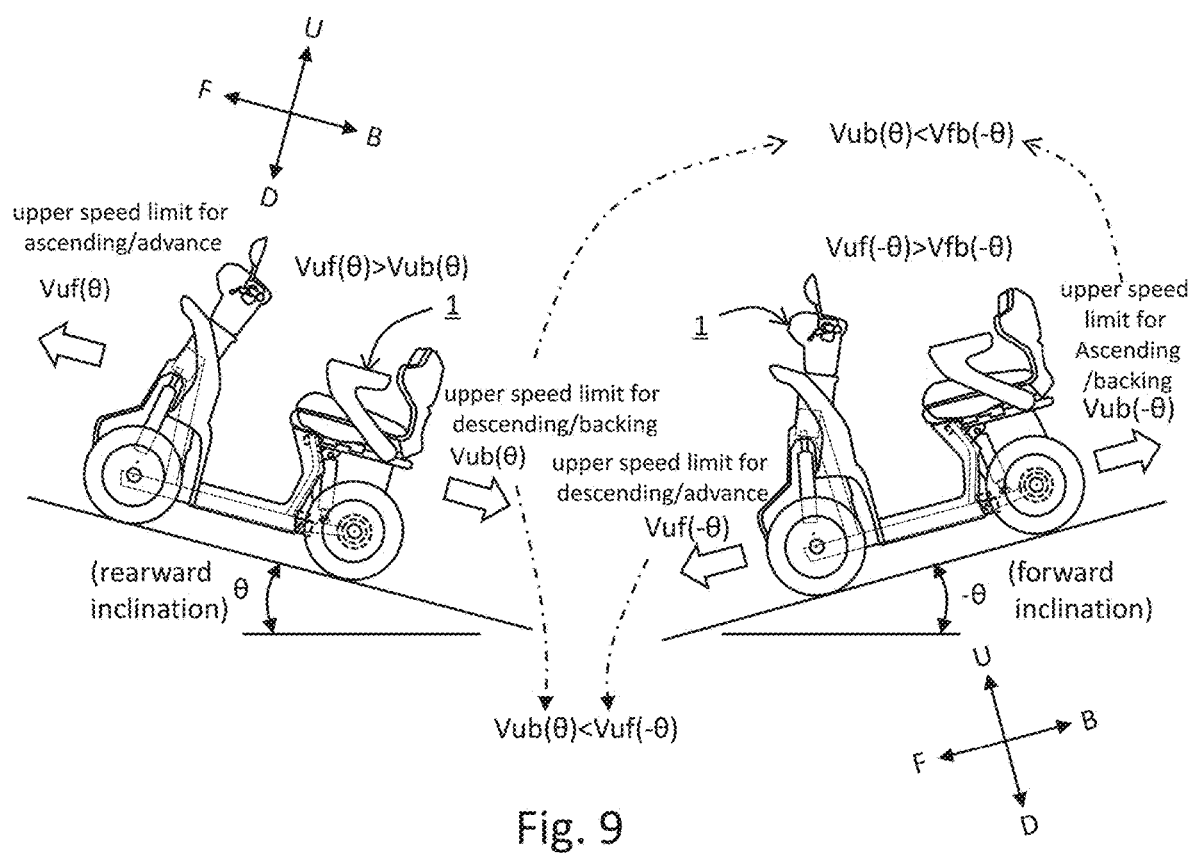
FIG. 9 illustrates an example of how the control unit controls the vehicle speed depending on the inclination.

In FIGS. 1, 2, and 9, arrow F indicates the forward direction with respect to the vehicle. Arrow B indicates the rearward direction with respect to the vehicle. Arrow U indicates the upward direction with respect to the vehicle. Arrow D indicates the downward direction with respect to the vehicle. Arrow R indicates the right direction with respect to the vehicle. Arrow L indicates the left direction with respect to the vehicle.

The front-rear direction, left-right direction, and top-bottom direction of the vehicle are determined with respect to the vehicle-body frame of the vehicle. In other words, the front-rear direction, left-right direction, and top-bottom direction of the vehicle refer to the front-rear direction, left-right direction, and top-bottom direction of the vehicle-body frame. Side view means a view of the vehicle in the left-right direction. In FIGS. 1 and 2, the top-bottom direction of the vehicle-body frame is aligned with the vertical direction. In other words, FIGS. 1 and 2 show the vehicle as being upright, without being inclined forward or rearward and without tilting to the left or right.

A rotation of the vehicle-body frame about an axis extending in the front-rear direction of the vehicle-body frame represents a rotation in roll, i.e., an inclination in roll. A rotation of the vehicle-body frame about an axis extending in the left-right direction of the vehicle-body frame represents a rotation in pitch, i.e., an inclination in pitch. In the description provided below, an angle of inclination in roll, i.e., a roll angle, is measured with respect to the vehicle-body frame with its top-bottom axis aligned with the vertical direction, which will be treated as the reference (i.e., 0°). A positive value of roll angle means an inclination toward the right from the reference, whereas a negative value of roll angle means an inclination toward the left from the reference. An angle of inclination in pitch, i.e., a pitch angle, is an angle, relative to the horizontal plane, of the front-rear axis of the vehicle-body frame as measured with respect to the vehicle-body frame with its front-rear axis aligned with the horizontal plane, which will be treated as the reference (i.e., 0°). A positive value of pitch angle means that the front portion of the vehicle-body frame is located higher than the rear portion (i.e., the vehicle-body frame inclined rearward), whereas a negative value of pitch angle means that the front portion of the vehicle-body frame is located lower than the rear portion (i.e., the vehicle-body frame inclined forward).

In the description provided below, mere statements of "front/forward" and "rear (ward)", "left" and "right", and "top/up(ward)" and "bottom/down(ward)" refer to the forward direction as determined along the front-rear direction of the vehicle, the rearward direction along the front-rear direction of the vehicle, the left direction along the left-right direction of the vehicle, the right direction along the left-right direction of the vehicle, the upward direction along the top-bottom direction of the vehicle, and the downward direction along the top-bottom direction of the vehicle, respectively.

FIG. 1 is a perspective view of a vehicle according to a preferred embodiment of the present invention, showing an exemplary construction. FIG. 2 is a side view of the vehicle 1 shown in FIG. 1. By way of example, the vehicle 1 is a one-occupant electric vehicle. The vehicle 1 includes a vehicle-body frame 2, a seat 4 attached to the vehicle-body frame 2 to allow the occupant to sit thereon, front wheels 8*f* and rear wheels 8*b* rotatably attached to the vehicle-body frame 2 (hereinafter sometimes collectively referred to as wheels 8), a power source 9 that generates a force to drive the wheels 8, a control unit 10 (controller) configured or programmed to control driving of at least one wheel by the power source, and an inclination sensor 15 to detect the inclination of the vehicle-body frame 2. Two front wheels 8*f*, to the left and right, and two rear wheels 8*b*, to the left and right, are provided. By way of example, the power source 9 is a motor that drives the rear wheels 8*b*. The inclination sensor 15 detects the inclination of the vehicle-body frame in at least one of pitch or roll.

The inclination sensor 15 may include an acceleration sensor to detect accelerations in three axial directions, for example. In such implementations, the inclination sensor 15 is able to detect an inclination in pitch or roll based on accelerations in the three axial directions, for example. Further, the inclination sensor 15 may include an angular velocity sensor (i.e., gyro-sensor) that detects angular velocities about the three axes. In such implementations, the inclination sensor 15 is able to detect a pitch angular velocity and a roll angular velocity with the angular velocity sensor, for example. Furthermore, the inclination sensor 15 may be a 6-axis sensor that detects accelerations in three axial directions and angular velocities about three axes. In such implementations, the inclination sensor 15 detects a pitch angle and a roll angle using accelerations in the three axial directions and angular velocities about the three axes, for example. By way of example, the inclination sensor 15 may calculate pitch angle and roll angle from accelerations in the three axial directions and correct these angles with angular velocities about the three axes, and output the results as detection values of pitch angle and roll angle. The inclination sensor 15 may calculate the angles by integrating detected angular velocities, for example. In some implementations, based on a detection value from the inclination sensor 15 (e.g., at least one of an acceleration or an angular velocity), the control unit 10 may calculate a value indicating an angle of inclination, such as a pitch angle or a roll angle.

The control unit 10 may control the vehicle speed using at least one of the pitch angle (or pitch angular velocity) or roll angle (or roll angular velocity) detected by the inclination sensor 15. That is, the control unit 10 may control the vehicle speed using the angle of inclination, may control the vehicle speed using the inclination angular velocity, or may control the vehicle speed using both of them. Alternatively, the control unit 10 may use other detection values. For example, the vehicle speed may be controlled using an angular acceleration obtained by differentiating an angular velocity, accelerations in the three axial directions, or other sensor values.

Although not shown, the vehicle 1 may include a vehicle speed sensor. The vehicle speed sensor may be configured to detect a vehicle speed by detecting rotation of the wheels 8, for example. Detection of a vehicle speed is not limited to such a configuration. For example, a vehicle speed may be detected using an acceleration detected by the acceleration sensor.

The control unit 10 may include, for example, a computer including a processor and memory, or circuitry. Preferred embodiments of the present invention also encompass a program that causes the computer to execute the process of the control unit 10 and a non-transitory storage medium storing such a program.

Figure 3:
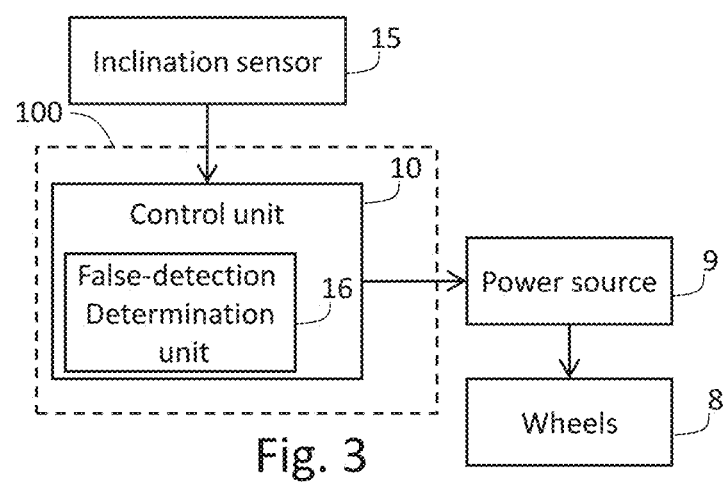
FIG. 3 is a functional block diagram illustrating an exemplary configuration including the vehicle control system for the vehicle shown in FIG. 1.

FIG. 3 is a functional block diagram illustrating an exemplary configuration including the vehicle control system of the vehicle 1 shown in FIG. 1. In FIG. 3, the control unit 10 controls the vehicle speed in at least one of the advancing direction or reversing direction of the vehicle generated by driving of at least one of the wheels by a force from the power source 9, depending on the inclination of the vehicle-body frame 2 detected by the inclination sensor 15. The control unit 10 includes a false-detection determination unit 16. An example of the control will be described below. The vehicle control system 100 is mainly composed of the control unit 10.

Figure 4:
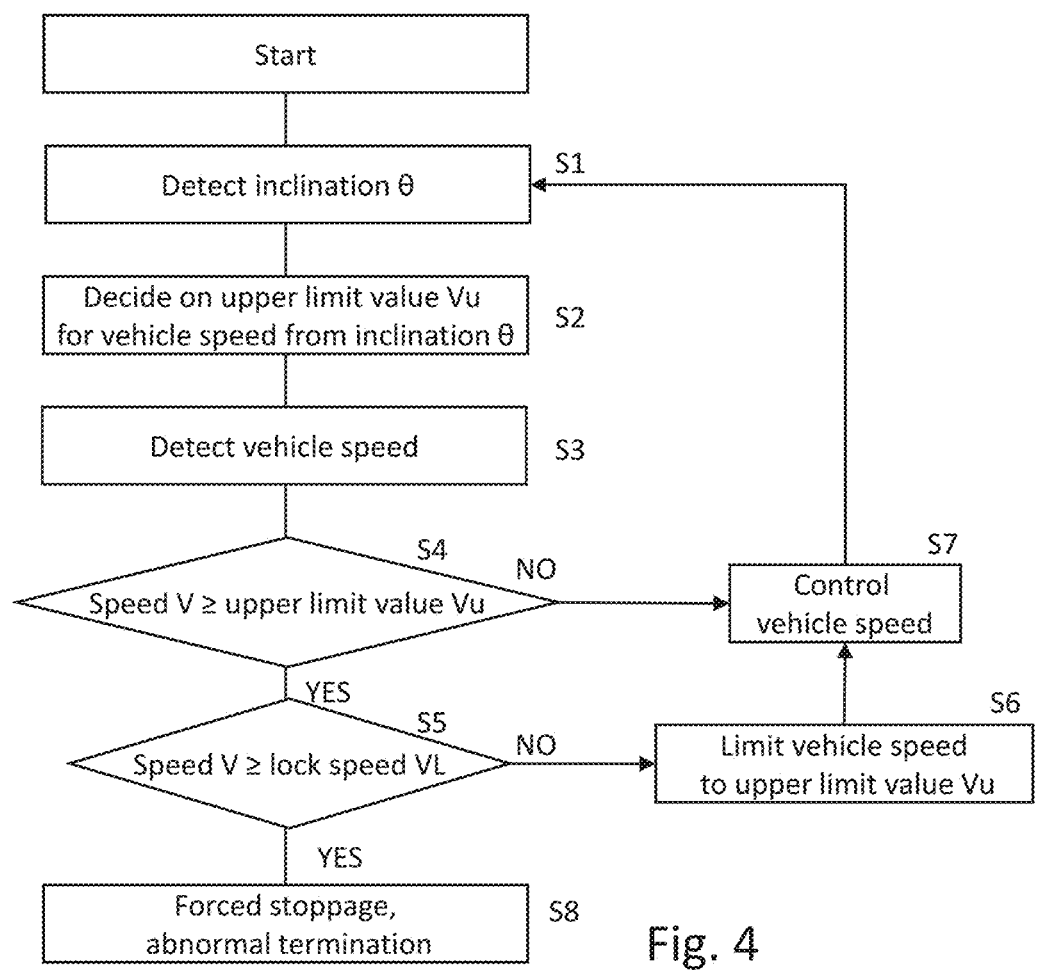
FIG. 4 is a flow chart showing an example of how a control unit controls vehicle speed.

FIG. 4 is a flow chart showing an example of how the control unit 10 controls the vehicle speed. In the implementation of FIG. 4, for example, upon power-on of the vehicle 1, the control unit 10 initiates the process. The control unit 10 acquires a detection value of inclination of the vehicle-body frame 2 from the inclination sensor 15 (S1). As an example, an implementation where the pitch angle θ of the vehicle-body frame 2 is detected by the inclination sensor 15 will be described. Based on the inclination, i.e., pitch angle θ, of the vehicle-body frame 2 acquired at step S1, the control unit 10 decides on an upper limit of the vehicle speed (S2).

At step S2, the control unit 10 may determine the upper limit value of the vehicle speed corresponding to the detection value of inclination using correspondence data stored in advance on the storage device included in the control unit 10. The correspondence data may be, for example, data indicating the correspondence between a detection value of inclination and an upper limit value of the vehicle speed. The correspondence data is not limited to any particular format, and may be a map or table, for example, or program data such as a function that receives a detection value as input and returns an upper limit value.

Figure 5:
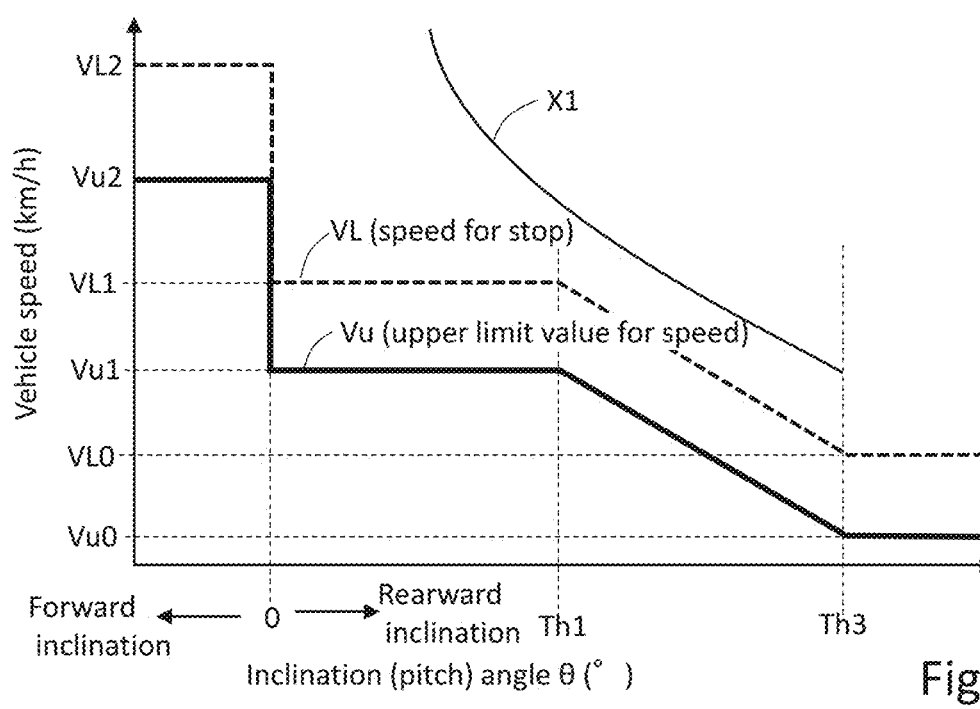
FIG. 5 is a graph showing an exemplary relationship between an angle of inclination in pitch of the vehicle and an upper limit of the vehicle speed.

FIG. 5 is a graph showing an exemplary relationship between the angle of inclination in pitch and the upper limit of the vehicle speed. In FIG. 5, the upper limit value of the vehicle speed is indicated by Vu. In the implementation of FIG. 5, when the vehicle is inclined forward or not inclined ($θ≤0°$), the upper limit value Vu of the vehicle speed is constant at the upper limit value Vu2. When the vehicle is inclined rearward and the angle of inclination is up to the first threshold Th1 ($0<θ≤Th1$), the upper limit value Vu of the vehicle speed is constant at the upper limit value Vu1. This upper limit value Vu1 is lower than the upper limit value Vu2 for forward inclination (Vu1<Vu2). When the vehicle is inclined rearward and the angle of inclination is larger than the first threshold Th1 and smaller than the third threshold ($Th1≤θ≤Th3$), the upper limit value Vu of the vehicle speed decreases as the angle of inclination increases. When the vehicle is inclined rearward and the angle of inclination is equal to or larger than the third threshold Th3, the upper limit value Vu1 is constant at the upper limit value Vu0. This upper limit value Vu0 is the minimum value within the range of all the values that can be taken by the upper limit value Vu. The control unit 10 may, for example, use correspondence data indicating the relationship between the inclination and upper limit value shown in FIG. 5 to determine the upper limit value of the vehicle speed corresponding to the detection value of the inclination detected.

At step S3 in FIG. 4, the control unit 10 detects the vehicle speed V. For example, the control unit 10 acquires the vehicle speed V from the vehicle speed sensor. The control unit 10 determines whether the vehicle speed V is not lower than the upper limit value Vu determined at step S2 (S4). If V<Vu (NO at step S4), the control unit 10 controls the vehicle speed without changing the upper limit value of the vehicle speed V (S7). Step S7 is not limited to any particular vehicle speed control and may be, for example, a vehicle speed control based on an operation or a remote operation by the occupant, or vehicle speed control with autonomous driving.

If V≥Vu (YES at step S4), the control unit 10 determines whether the vehicle speed V is not lower than the automatic-stop speed VL (S5). If V≥VL (YES at step S5), the control unit 10 determines that control is impossible, forcibly stops the power source 9, and ends the process by abnormal termination (S8). If V<VL (NO at step S5), the control unit 10 controls the power source 9 such that the vehicle speed V reaches the upper limit value Vu. Thus, the control unit 10 controls the power source 9 to lower the vehicle speed V if the vehicle speed V is not lower than the upper limit value Vu determined depending on the inclination. The process including steps S1 to S7 above is repeatedly performed until YES at step S8 results in a forced stoppage or until the vehicle 1 is powered off and the process ends, for example.

At step S2 in FIG. 4, in addition to an upper limit value Vu of the vehicle speed, the control unit 10 may also decide on an automatic-stop speed VL depending on the angle of inclination θ. In the graph shown in FIG. 5, the automatic-stop speed is indicated by VL. In the implementation of FIG. 5, the automatic-stop speed VL is set to a value higher than the upper limit value Vu of the vehicle speed. Further, the automatic-stop speed VL varies depending on the angle of inclination. The automatic-stop speed VL varies depending on the angle of inclination in the same manner as the upper limit value Vu of the vehicle speed. In FIG. 5, line X1 indicates conditions of vehicle speed and inclination under which automatically stopping the wheels during traveling will cause one of the wheels to leave the ground. The automatic-stop speed VL is preferably set within the range of vehicle speed below the vehicle speed indicated by line X1. Thus, the vehicle can be automatically stopped before reaching a vehicle speed at which an automatic stoppage would cause one of the wheels to leave the ground. Thus, the control unit 10 may decide on an automatic-stop speed depending on the inclination using data indicating the relationship between the inclination and automatic-stop speed shown in FIG. 5, for example. Alternatively, the automatic-stop speed VL may be set to a constant value regardless of the inclination.

At step S2 in FIG. 4, the false-detection determination unit 16 may determine whether the detection value from the inclination sensor 15 is a false detection. The false-detection determination unit 16 may determine that a false detection has occurred when, for example, the detection value from the inclination sensor is outside a predetermined normal range or when no detection value can be acquired from the inclination sensor 15. If the false-detection determination unit 16 determines that a false detection has occurred, the control unit 10 sets the upper limit value Vu of the vehicle speed to a predetermined constant speed. This constant speed may be, for example, the minimum value within the range of values that can be taken by the upper limit value Vu (Vu0 in the implementation of FIG. 5).

Figure 6:
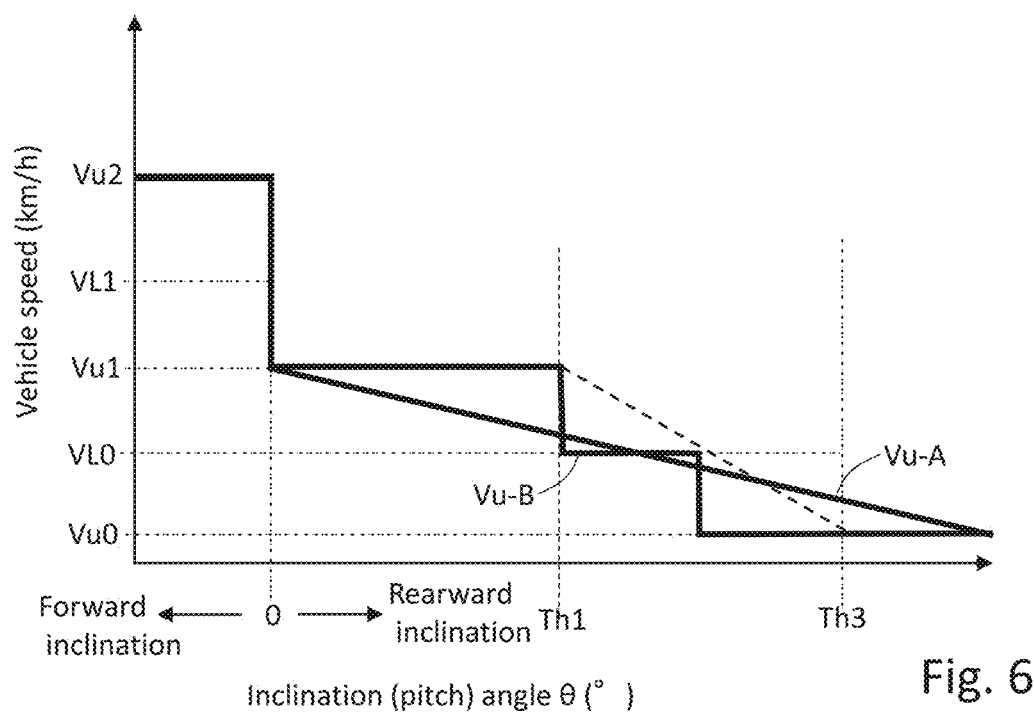
FIG. 6 is a graph showing a variation of the relationship between the inclination and an upper limit value of the vehicle speed.

FIG. 6 is a graph showing a variation of the relationship between the inclination and the upper limit value Vu of the vehicle speed. FIG. 6 shows a variation of the control where the upper limit value Vu of the vehicle speed is lowered as the inclination of the vehicle-body frame 2 increases. For the upper limit value Vu-A in FIG. 6, the rate of decrease in the upper limit of the vehicle speed in response to an increase in the inclination in pitch is constant. In the implementation of FIG. 5, the range of inclination angles of rearward inclination includes ranges of implausibility, where the upper limit of the vehicle speed remains unchanged even when the inclination increases (for example, for Vu in FIG. 5, $0<θ≤Th1$ and $Th3≤θ$). In contrast, for the upper limit value Vu-A in FIG. 6, the range of inclination angles of rearward inclination includes no range of implausibility. In such implementations, the control is such that the upper limit of the vehicle speed is lowered as the angle of inclination increases across the entire range of inclination angles of rearward inclination that can be taken by the vehicle-body frame 2.

For the upper limit value Vu-B in FIG. 6, the upper limit of the vehicle speed decreases stepwise as the inclination in pitch increases. In such implementations, in the range of inclination angles of rearward inclination, a range of implausibility and a range (or point) where the upper limit of the vehicle speed changes depending on the inclination are alternately repeated.

The upper limit value Vu of the vehicle speed shown in FIGS. 5 and 6 discussed above may be the upper limit value Vu of the vehicle body in the reversing direction of the vehicle 1. In such implementations, at step S4 in FIG. 4, the vehicle speed in the reversing direction of the vehicle 1 is compared with the upper limit value Vu. In such implementations, the vehicle speed when the vehicle 1 is reversing and descending on a slope is controlled. Similarly, data indicating the relationship between the upper limit value of the vehicle speed in the advancing direction and the inclination may be stored, and the control unit 10 may decide on an upper limit value of the vehicle speed in the advancing direction depending on the inclination. This enables controlling the vehicle speed when the vehicle is advancing on an inclined surface.

The relationship between the inclination in pitch and the upper limit of the vehicle speed is not limited to the implementations of FIGS. 5 and 6. In the implementations of FIGS. 5 and 6, the minimum value Vu0 for the upper limit value of the vehicle speed is not zero. Alternatively, for example, a relationship between the inclination and the upper limit of the vehicle speed may be set such that the minimum value Vu0 is zero.

Figure 7:
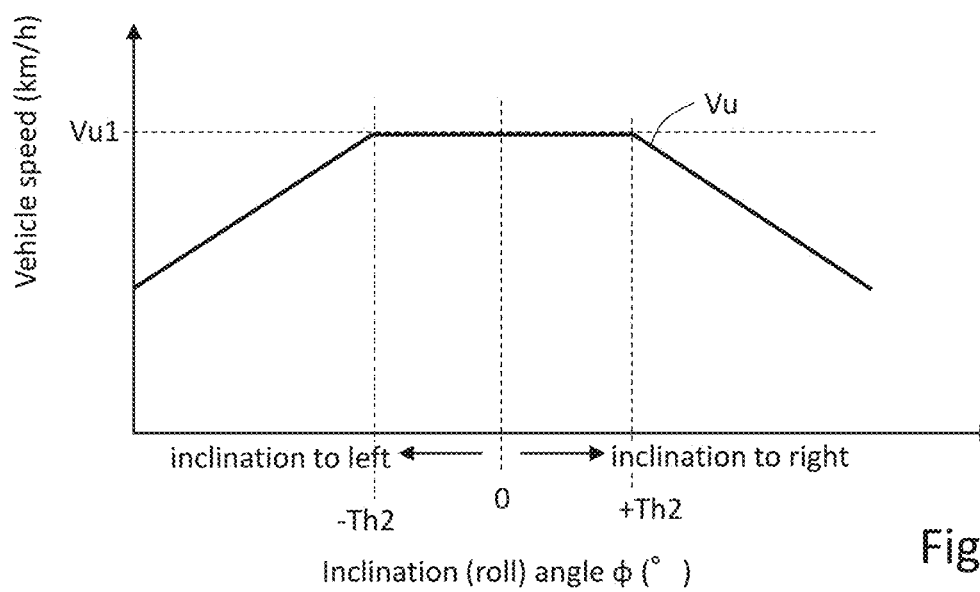
FIG. 7 is a graph showing an exemplary relationship between the inclination in roll of the vehicle and the upper limit of the vehicle speed.

In the implementations shown in FIGS. 5 and 6, the control unit 10 controls the vehicle speed depending on the inclination in pitch. In addition to pitch, or in lieu of pitch, the control unit 10 may control the vehicle speed depending on the inclination in roll. FIG. 7 is a graph showing an exemplary relationship between the inclination in roll and the upper limit of the vehicle speed in an implementation where the upper limit of the vehicle speed is controlled depending on the inclination in roll. In the implementation shown in FIG. 7, the upper limit value Vu of the vehicle speed decreases when the absolute value of the roll angle with an inclination to the right (0<φ) or the roll angle with an inclination to the left (φ21 0) is equal to or larger than the second threshold Th2. The control unit 10 uses the data indicating the relationship between the roll angle φ and the upper limit value Vu of the vehicle speed shown in FIG. 7 to decide on an upper limit of the vehicle speed depending on the inclination in roll. This enables controlling the speed when, for example, the vehicle is turning or traversing on a slope and the inclination to the left or right is larger than the second threshold Th2. It will be understood that the upper limit value Vu of the vehicle speed in FIG. 7 may be the upper limit of the vehicle speed in one of the advancing direction or the reversing direction, or may be the upper limit of the vehicle speed in both the advancing direction and the reversing direction.

Figure 8:
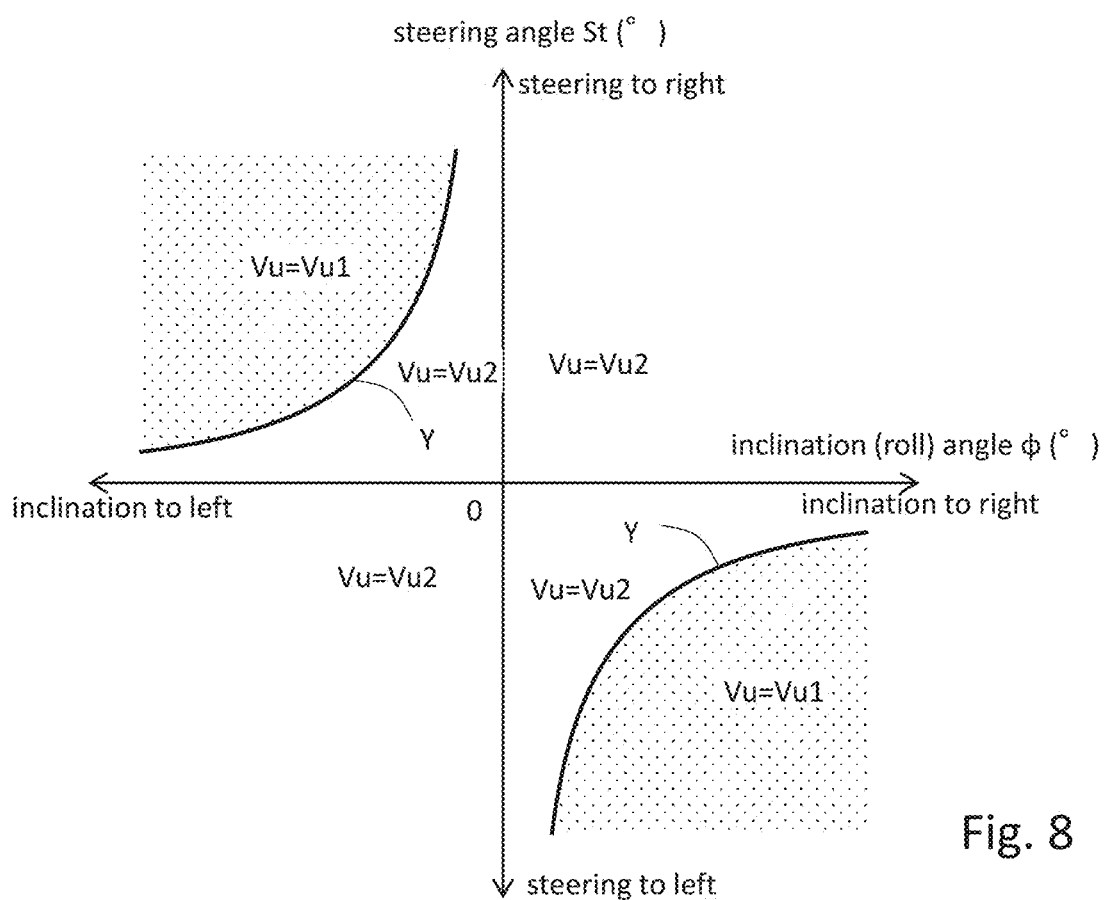
FIG. 8 is a graph showing an exemplary relationship between the inclination in roll, a steering condition, and the upper limit of the vehicle speed.

FIG. 8 is a graph showing an exemplary relationship between the inclination in roll, the steering condition, and the upper limit of the vehicle speed in an implementation where the upper limit of the vehicle speed is controlled depending on the inclination in roll and the steering condition. In the graph of FIG. 8, the vertical axis indicates the steering angle St, whereas the horizontal axis indicates the roll angle φ. In this graph, the upper limit value Vu of the vehicle speed is set to Vu1 in the regions where the amount of steering and the angle of inclination in roll are larger than are indicated by line Y, whereas the upper limit value Vu of the vehicle speed is set to Vu2 in the region where the amount of steering and the angle of inclination in roll are smaller than are indicated by line Y. Vu1 and Vu2 are different values; for example, Vu1<Vu2. Such data mapping the upper limit value Vu of the vehicle speed depending on the values of steering angle and roll angle may be used as correspondence data. The control unit 10 may use correspondence data, such as that in FIG. 8, indicating the relationship between the combination of a steering angle, a roll angle, and the upper limit of the vehicle speed to decide on an upper limit of the vehicle speed depending on the steering state and the inclination in roll that have been detected.

In the implementation shown in FIG. 8, the vehicle speed when the vehicle-body frame 2 is inclined to the right and steering occurs toward the left with a significant operation of the handlebar is limited to not more than the upper limit value Vu1. Further, the vehicle speed when the vehicle-body frame 2 is inclined to the left and steering occurs toward the right with a significant operation of the handlebar is limited to not more than the upper limit value Vu1. This enables such control as to lower the vehicle speed when, for example, the vehicle 1 is traversing on a slope and the handlebar is operated to a significant degree to steer in the ascending direction.

FIG. 9 illustrates an example of how the control unit 10 controls the vehicle speed depending on the inclination. In FIG. 9, the left half shows the vehicle 1 traveling on a slope with an inclination angle θ with its front portion higher than its rear portion, whereas the right half shows the vehicle traveling with its rear portion higher than its front portion. The pitch angles θ detected by the inclination sensor in these cases have opposite plus/minus signs. In view of this, for ease of explanation, the pitch angle detected in the case of the right half is indicated as "−θ". The control of the upper speed limit is not limited to the implementation shown in FIG. 9.

In the state shown in the left half of FIG. 9, the control unit 10 may perform such a control that the upper speed limit for ascending/advancing, when the vehicle 1 is advancing and ascending on a slope, Vuf(θ), is higher than the upper speed limit for descending/reversing, when the vehicle is reversing and descending, Vub(θ) (i.e., Vuf(θ)>Vub(θ)). This control facilitates achieving a comfortable state depending on the traveling environment.

In the state shown in the right half of FIG. 9, the control unit 10 may perform such a control that the upper speed limit for descending/advancing, when the vehicle 1 is advancing and descending on a slope, Vuf(−θ), is higher than the upper speed limit for ascending/reversing, when the vehicle is reversing and ascending, Vub(−θ) (i.e., Vuf(−θ)>Vub(−θ)). This control facilitates achieving a comfortable state depending on the traveling environment.

The control unit 10 may perform such a control that the upper speed limit for descending/advancing Vuf(−θ) in the right half of FIG. 9 is higher than the upper speed limit for descending/reversing Vub(θ) in the left half (i.e., Vuf(−θ)>Vub(θ)). This control facilitates achieving a comfortable state depending on the traveling environment. Further, the control unit 10 may perform such a control that the upper speed limit for ascending/reversing Vub(−θ) in the right half of FIG. 9 is higher than the upper speed limit for descending/reversing Vub(θ) in the left half of FIG. 9 (i.e., Vub(−θ)>Vub(θ)). This control facilitates achieving a comfortable state depending on the traveling environment.

The control by the control unit 10 is not limited to the above-illustrated implementations. In the above-illustrated implementations, the vehicle speed is controlled depending on the inclination by determining an upper limit of the vehicle speed depending on the inclination. The control is not limited to implementations where the upper limit of the vehicle speed is controlled. For example, the control unit 10 may perform such a control as to lower the vehicle speed depending on the inclination without controlling the upper limit of the vehicle speed, for example. For example, the control unit 10 may perform such a control as to lower the vehicle speed when the inclination sensor 15 has detected that the vehicle 1 is reversing and descending on a slope. Further, in such implementations, the amount of decrease in the vehicle speed may be controlled depending on the vehicle speed or the rate of change in vehicle speed over time.

Returning to FIG. 2, an exemplary construction of the vehicle 1 will be described in detail. In the implementation shown in FIG. 2, the vehicle-body frame 2 supports front wheels 8f, a rear wheel 8b, and a seat 4. The vehicle-body frame 2 includes a lower frame portion 24 at a lower location of the vehicle 1 extending in the front-rear direction, a down tube 21 coupled to a front portion of the lower frame portion 24, a head pipe 22 attached to a front portion of the down tube 21, a front frame portion 23 located forward of the lower frame portion 24, and a seat frame portion 25 extending upward from a rear portion of the lower frame portion 24 to support the seat 4. The seat frame portion 25 supports the seat 4. A backrest 6 is provided rearward of the seat 4. Further, arm supports 5 are provided to the left and right of the seat 4 (see FIG. 1). In the present implementation, the seat 4 is of the chair type, and not of the straddle type. A footboard 3 is provided above the lower frame portion 24 to allow the occupant to place his/her feet thereon.

The vehicle 1 includes a rear arm 51 that supports the rear wheel 8b. The rear arm 51 is attached to the lower frame portion 24, i.e., vehicle-body frame 2, so as to be rotatable about a pivot shaft 56. The rear arm 51 supports the rear wheel 8b such that the rear wheel is rotatable about the vehicle axle bwj. The rear arm 51 a swingarm that is able to swing. A rear suspension 53 is provided between the rear arm 51 and the seat frame portion 25 (i.e., vehicle-body frame 2). A lower portion of the rear suspension 53 is rotatably coupled to the rear arm 51. An upper portion of the rear suspension 53 is rotatably coupled to the seat frame portion 25. The rear arm 51 swings as the rear suspension 53 is contracted and extended.

The head pipe 22 rotatably supports the steering axle 26. The handlebar 7 is attached to the top of the steering axle 26. Rotation of the steering axle 26 is transmitted to the front wheels 8f. The front wheels 8f are steered by the handlebar 7. For example, a rotation sensor (not shown) may be provided on the head pipe 22 to detect rotation of the steering axle 26 or handlebar 7. The rotation sensor is an example of a steering detection unit that detects at least one of a steering angle or a direction of steering.

One end of each of arms 41 and 42 is rotatably attached to the front frame portion 23. The other ends of the arms 41 and 42 are rotatably attached to a knuckle arm 47. The knuckle arms 47 rotatably support the front wheels 8f. The arms 41 and 42 include pairs of arms 41 and 42 disposed at the top and bottom. Coupled to the bottom of the steering axle 26 is a pitman arm 49 that rotates together with the steering axle 26. The pitman arm 49 is coupled to the knuckle arms 47 with a tie rod (not shown) provided therebetween. The rotation of the steering axle 26 is transmitted to the front wheels 8f via the pitman arm 49, tie rod, and knuckle arms 47.

Front suspensions 43 are provided between the arms 41 and vehicle-body frame 2 (i.e., head pipe 22 in the implementations of FIG. 2). One end of each front suspension 43 is rotatably attached to the vehicle-body frame 2, while the other end is rotatably attached to the associated arm 41. The front suspensions 43 and arms 41 and 22 define an independent front suspension system. The front suspension system may be, for example, a wishbone suspension.

As shown in FIG. 1, the front wheels 8f are implemented as two wheels disposed to the left and right. Thus, a pair of arms 41 and 42, a knuckle arm 47, and a front suspension 43 are provided for each of the two front wheels 8f to the left and right.

In the vehicle 1, the rear suspension 53 and rear arm 51 define an independent rear suspension system. The rear suspension system may be, for example, a trailing arm suspension. The front and rear suspensions 43 and 53 are axially extendable shock absorbers, and include a coil spring and a damper, for example.

As in the implementation above, the vehicle 1 may include at least one of a front suspension that supports the front wheels or a rear suspension that supports the rear wheel. Thus, the upper limit of the vehicle speed is controlled based on the inclination of the vehicle-body frame that changes depending on the contraction/extension of the suspension(s). This enables controlling the upper limit of the vehicle speed by detecting small changes in the environment.

The vehicle 1 according to the present preferred embodiments includes an independent front suspension system and an independent rear suspension system. This improves the ability of the vehicle 1 to follow irregularities of the road surface. Further, it increases the ability of the vehicle 1 to turn. The front and rear suspension systems are not limited to the above exemplary construction.

Preferred embodiments of the present invention can suitably be applied to small-sized vehicles with a small total length relative to the height of the center of gravity. The effects of the preferred embodiments are significant in such a small-sized vehicle, in which attitude control upon sudden braking tends to be more difficult. Although not limiting, in a small-sized vehicle, the ratio of the height Ha of the uppermost point 4u of the sitting surface of the seat from the ground to the total length L0 of the vehicle as measured in the front-rear direction may be not less than 0.33 and not more than 0.58 ($0.4 \leq Ha/L0 \leq 0.58$), for example. Although not limiting, L0 may be 900 mm to 2000 mm, for example. For example, if L0=1200 mm, Ha may be in the range of 400 to 700 mm.

In implementations shown in FIG. 1, the vehicle 1 is a four-wheel, handled electric wheelchair. The vehicle 1 is not limited to a four-wheel, handled electric wheelchair as illustrated herein. The vehicle 1 may be, for example, a joy-stick electric wheelchair. Although not limiting, the vehicle may be a one-occupant electric wheelchair or, alternatively, may be a one-occupant carrier wagon, an electric cart, or a golf cart, for example. Furthermore, the number of wheels may be three or four or more. For example, in lieu of two rear wheels, one rear wheel may be provided. Furthermore, in lieu of two front wheels, one front wheels may be provided. Moreover, the power source is not limited to a motor, and may be, for example, an internal combustion engine, such as vehicle engine. Although the vehicle 1 in one of the implementations is constructed such that the occupant operates the handlebar to drive the vehicle, the vehicle may also be constructed such that the control unit 10 autonomously drives or remotely operates the vehicle, without relying on occupant operations.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vehicle comprising:
a vehicle-body frame;
a seat attached to the vehicle-body frame to allow an occupant to sit thereon;
at least three wheels including front and rear wheels rotatably attached to the vehicle-body frame;
a power source to generate a force to drive at least one of the three wheels;
a controller configured or programmed to control driving of the at least one wheel by the power source based on an operation or a remote operation by the occupant, or autonomously; and
an inclination sensor to detect an inclination, in at least one of pitch or roll of the vehicle-body frame; wherein
the controller is configured or programmed to control a vehicle speed in at least one of a direction of advancing or a direction of reversing the vehicle generated by the driving of the at least one wheel by the force from the power source depending on the inclination of the vehicle-body frame detected by the inclination sensor.

2. The vehicle according to claim 1, wherein the controller is configured or programmed to control the vehicle speed such that the larger the inclination of the vehicle-body frame, the lower an upper limit of the vehicle speed becomes.

3. The vehicle according to claim 1, wherein the controller is configured or programmed to lower an upper limit of the vehicle speed in the reversing direction of the vehicle when the inclination in pitch detected by the inclination sensor is in a direction with a front portion of the vehicle located higher than a rear portion, and is not smaller than a first threshold.

4. The vehicle according to claim 1, wherein the controller is configured or programmed to lower an upper limit of the vehicle speed in the reversing direction of the vehicle as the inclination in pitch increases within a predetermined pitch range if the inclination in pitch is in a direction with a front portion of the vehicle located higher than a rear portion.

5. The vehicle according to claim 1, wherein the controller is configured or programmed to lower an upper limit of the vehicle speed in the advancing direction or the reversing direction of the vehicle if the inclination in roll detected by the inclination sensor is not smaller than a second threshold.

6. The vehicle according to claim 1, wherein the controller is configured or programmed to lower an upper limit of the vehicle speed in the advancing direction or the reversing direction of the vehicle as the inclination in roll increases within a predetermined roll range.

7. The vehicle according to claim 1, further comprising:
a handlebar to steer the front wheel or wheels; and
a steering detector to detect steering by the handlebar; wherein
the controller is configured or programmed to control the vehicle speed using at least one of a direction of steering or a steering angle detected by the steering detector.

8. The vehicle according to claim 1, wherein
the controller is configured or programmed to stop the driving of the at least one wheel by the power source when the vehicle speed of the vehicle has reached an automatic-stop speed; and
the automatic-stop speed is set to a value higher than an upper limit of the vehicle speed depending on the inclination, and set depending on the inclination of the vehicle-body frame detected by the inclination sensor.

9. The vehicle according to claim 1, wherein
the controller is configured or programmed to control an upper limit of the vehicle speed depending on the inclination of the vehicle-body frame detected by the inclination sensor; and
the upper limit of the vehicle speed is controlled such that the larger the inclination of the vehicle-body frame, the lower the upper limit of the vehicle speed becomes, and the upper limit of the vehicle speed is set to a minimum value, other than zero, when the inclination is larger than a third threshold.

10. The vehicle according to claim 1, wherein the controller includes a false-detection determiner configured or programmed to determine whether a detection value from the inclination sensor is a false detection and, if the false-detection determiner has determined that the detection value is a false detection, to fix an upper limit of the vehicle speed of the vehicle to a constant speed regardless of the detection value from the inclination sensor.

11. The vehicle according to claim 10, wherein the constant speed is lower than the upper limit of the vehicle speed used when the vehicle-body frame is not inclined.

12. A vehicle control system comprising:
a controller to control a vehicle including a vehicle-body frame, a seat attached to the vehicle-body frame to allow an occupant to sit thereon, at least three wheels including front and rear wheels rotatably attached to the vehicle-body frame, and a power source to generate a force to drive at least one of the wheels; wherein
the controller is configured or programmed to:
control driving of the at least one wheel by the power source based on an operation or a remote operation by the occupant, or autonomously;
acquire from an inclination sensor provided on the vehicle information indicating an inclination, in at least one of pitch or roll of the vehicle-body frame; and
control a vehicle speed in at least one of a direction of advancing or a direction of reversing the vehicle generated by the driving of the at least one wheel by the force from the power source depending on the inclination of the vehicle-body frame acquired from the inclination sensor.

* * * * *